(12) United States Patent
Chung et al.

(10) Patent No.: US 6,614,921 B1
(45) Date of Patent: Sep. 2, 2003

(54) 3-D LOCALIZATION OF CLUSTERED MICROCALCIFICATIONS USING CRANIO-CAUDAL AND MEDIO-LATERAL OBLIQUE VIEW

(75) Inventors: Pau-Choo Chung, Tanan (TW); Chien-Shun Lo, Tanan (TW); Chein-I Chang, Tanan (TW); San-Kan Lee, Tanan (TW); Ching-Wen Yang, Tainan (TW)

(73) Assignee: National Science Council, Taipei (TW)

( * ) Notice: Subject to any disclaimer, the term of this patent is extended or adjusted under 35 U.S.C. 154(b) by 0 days.

(21) Appl. No.: 09/553,725

(22) Filed: Apr. 20, 2000

(30) Foreign Application Priority Data

Jul. 16, 1999 (TW) ........................................ 88112251 A

(51) Int. Cl.⁷ ................................................ G06K 9/00
(52) U.S. Cl. ...................... 382/131; 382/225; 382/226; 382/285; 128/915
(58) Field of Search ................................ 382/128, 132, 382/224, 225, 226, 285, 131; 128/915

(56) References Cited

U.S. PATENT DOCUMENTS

| | | | | |
|---|---|---|---|---|
| 5,544,219 A | * | 8/1996 | Muller et al. | 378/210 |
| 6,018,728 A | * | 1/2000 | Spence et al. | 706/20 |
| 6,125,194 A | * | 9/2000 | Yeh et al. | 382/132 |
| 6,272,233 B1 | * | 8/2001 | Takeo | 382/128 |

OTHER PUBLICATIONS

A Simple Method for Automatically Locating the Nipple on Mammograms by Chandrasekhar et al., IEEE Transactions on Medical Imaging, vol. 16, No. 5, Oct. 1997, pp. 483–494.*

Edward A. Sicles, MD, "Breast Calcifications: Mammographic Evaluation," Radiology, vol. 160 (No. 2), p. 289–293, (Feb. 21, 1986).

Lawrence W. Bassett, MD., "Mammographic Analysis of Calcifications," Breast Imaging: Current Status And Future Directions, Radiologic Clinics of North America, vol. 30 (No. 1), p. 93–105, (Jan. 21, 1992).

Robert L. Eagan, MD et al., "Intramammary Calcifications Without An Associated Mass in Benign and Malignant Diseases," Diagnostic Radiology, p. 1–7, (Oct. 21, 1980).

Stephen A. Feig, M.D. et al., "Breat Microcalcifications: Early Warning For Cancer," Diagnostic Imaging, p. 132–137, Nov. 1990.

Unknown, "Ductal Carcinomas of Varying Histologic Types," Calcifications Within the Lobular and Ductal System of the Breast, p.91–107.

* cited by examiner

Primary Examiner—Jon Chang
Assistant Examiner—Charles Kim
(74) Attorney, Agent, or Firm—Gene Scott-Patent Law & Venture Group

(57) ABSTRACT

A method using CC and MLO views localized in a display in 3-D as a breast virtual model, incorporating, feature capturing using gradient, energy and entropy codes, calibration classification according to features using binary decision trees, nipple detection, and 3-D spatial coordinate transformation and display of breast clustered microcalcifications.

5 Claims, 15 Drawing Sheets

(a)

(b)

(a)

(b)

(a)

(b)

(c)

3-D LOCALIZATION OF CLUSTERED MICROCALCIFICATIONS USING CRANIO-CAUDAL AND MEDIO-LATERAL OBLIQUE VIEW

FIELD OF THE INVENTION

The invention, 3-D Localization of Clustered Microcalcifications using Cranio-Caudal (CC) and Medio-Lateral Oblique (MLO) Views, is a computer-aided 3-D localization method for needle biopsies in positioning breast clustered microcalcifications using Cranio-Caudal and Medio-Lateral Oblique Views. In coordination with a mammographic equipment, a 3-D breast virtual model can be displayed on personal computers or workstations installed with the system of the Invention. The method is of great help for doctors in identification of the spatial locations of clustered microcalcifications in breasts and the accurate determination of the number and coverage of clustered microcalcifications. The frequency of needle localization for biopsy can be considerably decreased, and thus waste of medical resources greatly reduced and efficiency enhanced.

BACKGROUND OF THE INVENTION

According to the report of Department of Health, Executive Yuan, breast cancer is the second most frequent occurring cancer among women in Taiwan, the morbidity and mortality of which is unfortunately continuously increasing.

At present, mammography is generally recognized as the most effective photographic tool for detecting early breast cancer that reported in 1992 by L. W. Bassett on Radiological Clinics of North America (vol. 30, pp. 93–105). Appearance of clustered microcalcifications is a signal of an impalpable early breast cancer. In 1990, S. A. Feig et al. published in Diagnostic Imaging (vol. 11, pp. 132–138) that 90% of nonpalpable in situ ductal carcinomas and 70% of nonpalpable minimal carcinomas are visible on microcalcifications alone. Diagnosis of microcalcifications of malignant breast cancer was becoming vital. In "Diagnosis and Differential Diagnosis of Breast Calcifications" (pp.91–107) in 1986, M. Lanyi had claimed that, as early as 1960, many researches indicated some features of clustered microcalcifications were important for diagnosing malignant and benign breast cancer. However, according to the report published in Radiology (vol. 137, pp. 1–7) made by R. L. Egan et al. through analysis of a great number of cases, diagnoses of clustered calcifications were not reliable because of co-existence of both malignant and benign features. This makes diagnostic interpretation difficult. In this situation, most radiologists encourage biopsies, in spite of the fact that only 20%–30% of cases are proved to be malignant.

DESCRIPTION OF THE PRIOR ART

On average clinical diagnosis via mammography, two views will be taken of the same breast: one is the craniocaudal view (CC View), taken from a "head to toe" angle, and the other is the medio-lateral oblique view (MLO View), taken from an "oblique" angle. Doctors could initially determine the positions of lesions with the help of these two images before needle biopsy. But, when there are two or more clustered microcalcifications existing at the same time, or when clustered microcalcifications appear indistinct, it is not easy to exactly localize the clustered microcalcifications via these two images only. Thus, a needle localization method is adopted. To be brief, this is a method of repeating again and again the cycle of giving needle biopsies, taking mammograms, and calibrating the penetrating position till the exact lesion is detected. And then, a sample section is cut according to the position of the needle tip. Such operations as this have a heavy cost in terms of medical labor and resources to ensure lesion localization; besides, the invasion of needle biopsies and the X-ray of mammography is also painful and distressing for the patient.

Although there were a great many doctors engaged in efficient computer-aided mammographic systems from 1987 to 1996, most of these were diagnostic and analytic tools for microcalcifications in mammography, and provide little help with needle biopsies. [reported by H. P. Chan et al. on Med. Phy. (vol. 14, no. 4, pp. 538–548) in 1987, and by A. P. Dhawan et al. on IEEE Trans. On Medical Imaging (vol. 15, no. 3, pp. 246–259) in 1996.]

Regarding patents on localization of breast cancer lesions and on diagnosis and analysis of clustered microcalcifications. Some of these are for equipment such as: U.S. Pat. No. 5,183,463 which describes an "Apparatus for locating a breast mass," which is a cell sampling device for palpable breast tumor and is completely different from the Invention emphasizing an automatic localization and 3-D display. U.S. Pat. No. 51,974,824 describes a "Helical-tipped lesion localization needle device," which is equipped with a spiral thin needle convenient for users to prick into the marked lesions in the breast and thus has nothing to do with the Invention's localization method. U.S. Pat. No. 5,386,447 describes "Mammographic screening and biopsy apparatus," which is a special equipment patients can lie on a platform allowing the breasts to be placed vertically through the corresponding holes in the platform convenient for taking mammograms of a lesion with two different angles. These two images are useful for adjusting the needle positions. Although this equipment adopts the same method of taking mammograms of lesions as the Invention, there is still a great difference between them—it is the users that calibrate the needle positions with reference to the images, no computer-aided 3-D breast virtual model is displayed. U.S. Pat. No. 5,412,706 describes a "Mammogram marking system," which is a device used for adding remarks on the mammograms and is irrelevant to the Invention.

The other patents are specialized on methods of treatment, such as: U.S. Pat. No. 4,930,143 which describes a "Method and device for mammographic stereotactic punction of pathological lesions in the female breast," which consists of a method and equipment for improving needling accuracy. Thus again, without a computer-aided 3-D breast virtual model display, this patent has nothing to do with the Invention. U.S. Pat. No. 5,301,682 describes a "Method for locating a breast mass," which is an improved drawing device that can draw out tumor organizations and is also irrelevant to the Invention which emphasizes a 3-D breast virtual model display. U.S. Pat. No. 5,409,004 describes a "Localization device with radiopaque markings," which is a device for directing operations and, with its in-built needle, for cell sampling. It also is clearly quite different from the Invention because of its absence of computer-aided 3-D mammographic display. U.S. Pat. No. 5,426,685 describes the "Stereotactic mammography system imaging," which provides a special bed for a patient to lie on and let her breasts hang down, and in such a way as to allow 3-D mammography to be carried out. Like the Invention, this method is used to take 3-D lesions display; the major difference between them is: this method needs special equipment, but the Invention uses only traditional mammographic equipment to take mammograms and a computer to process the mammograms produced. Besides, the Invention uses a 3-D breast virtual model display to show the relative positions of lesions in the breasts. U.S. Pat. No. 5,544,219 describes the "Procedure for automatic position-finding of points of interest during a mammography examination using stereotactic technique," which provides a mammographic procedure for finding the positions of lesions of interest. It is different from the technique of position calibration used in the Invention and offers no 3-D display. U.S. Pat. No. Des. 360,947 describes the "Mammography imaging machine," which is a new mammographic device but has nothing to do with lesion localization. U.S. Pat. No. 5,594,769 describes the "Method and apparatus for obtaining stereotactic mammographic guided needle breast biopsies," which is an additive apparatus to the traditional mammographic device and is used in 3-D calibration of lesions. Like the Invention, it uses the traditional mammographic device; however, the greatest difference between them is that this device does not offer computer-aided 3-D breast & lesions display. Lastly U.S. Pat. No. 5,712,890 describes a "Full breast digital mammography device," which produces a complete mammography of breasts and is irrelevant to the lesions positioning.

SUMMARY OF THE INVENTION

The chief purpose of the "3-D Localization of Clustered Microcalcifications Using Cranio-Caudal(CC) and Medio-Lateral Oblique (MLO) Views" is to describes a computer-aided localization method for needle breast clustered microcalcifications biopsies.

In common clinic mammographic diagnoses, it will be easier to determine the positions of lesions by collaboration of the CC and MLO Views. But in some cases of more than one clustered microcalcifications or of vague clustered microcalcifications, it is not easy to localize the clustered microcalcification(s) using these two images only. Therefore, we have designed a computer-aided system for localizing clustered microcalcifications—using a computer system to analyze the features of clustered microcalcifications: gradient, energy and local entropy codes. Through multiple grouping calibrations, a 3-D spatial model of breast and lesions are thus established. The Invention is helpful to doctors in re-building the spatial information of clustered microcalcifications in a breast, identifying the exact number of clustered calcifications and the spread of their coverage, reducing the times of needle biopsies, decreasing waste of medical resources and thus enhancing diagnostic efficiency.

Anyone who is familiar with related techniques will clearly understand the purpose and merits of the Invention after reading the full case remarks illustrated by various figures as listed below.

BRIEF DESCRIPTION OF THE DRAWINGS

FIG. 1 Treatment Procedure

FIG. 5a) CC View

FIG. 5b) MLO View

FIG. 6a) Using the first calibration feature: gradient

FIG. 6b) Using the second calibration feature: energy

FIG. 6c) Using the third calibration feature: local entropy codes

FIG. 8a) 3-D display of two clustered microcalcifications

FIG. 8b) 3-D display in MLO View

FIG. 8c) 3-D display in CC View

DETAILED DESCRIPTION OF THE INVENTION

Figure 1A:
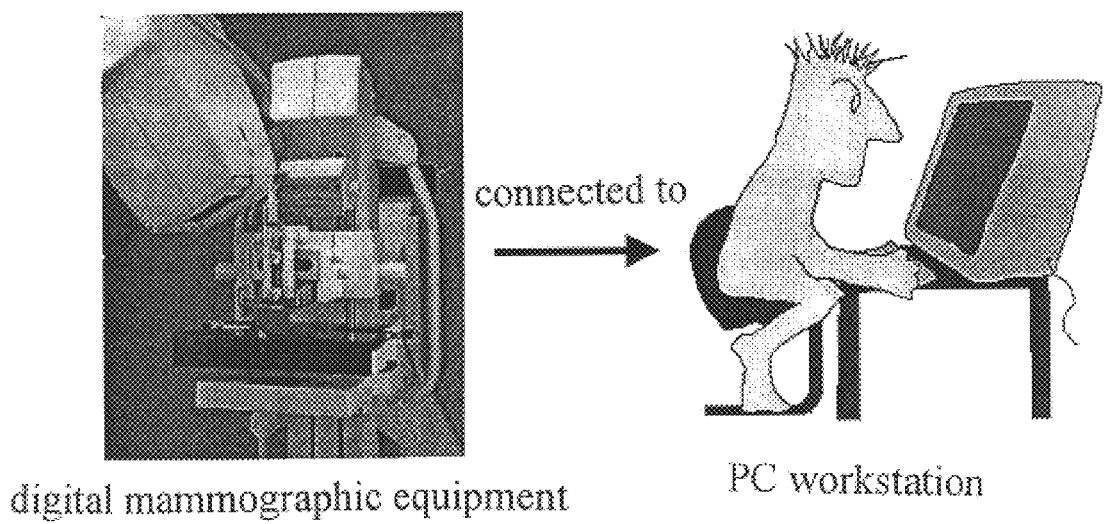
FIG. 1(a) Configuration of Hardware

The Invention, "3-D Localization of Clustered Microcalcifications Using Cranio-Caudal and Medio-Lateral Oblique Views," is a method to assist needle biopsy for locating breast clustered microcalcifications. CC and MLO Views are used in displaying a 3-D virtual breast model with 3-D locations of clustered microcalcifications, with the help of mammographic equipment and a PC workstation installed with the system software of the Invention. The treatment procedure of the Invention is shown in FIG. 1:

(a) Feature capturing: using gradient, energy and local entropy codes as the features in taking mammograms in CC and MLO Views;

(b) Calibration decision: classifying clustered microcalcifications according to their features by using a binary decision tree, and determining if two clusters are identical as per the results of classification;

(c) Nipple detection and localization: localizing the nipple in CC and MLO Views via analysis of the surface gradients and normal vector angles of a breast;

(d) 3-D spatial coordinate transformation of breast clustered microcalcifications: the positions of calibrated clustered microcalcifications relative to the nipple in CC and MLO Views are transformed into 3-D spatial coordinate positions;

(e) 3-D display of breast's clustered microcalcifications: the positions and coverage of the clustered microcalcifications in 3-D spatial coordinate are transformed into VRML (Virtual Reality Modeling Language) format in coordination with the breast model for browsing by using a VRML compatible browser.

The invention describes a computer-aided system for clustered microcalcification localization that is used to re-build a 3-D breast model and at the same time indicate the positions and coverage of clustered microcalcifications via computer imaging technique by inputting CC and MLO view images. Among which, the most difficult part is the calibration of the positions of the clustered microcalcifications in the two mammograms. Since breasts, as well as clustered microcalcifications, will be constricted and deformed when taking mammograms, the relations of the clustered microcalcifications between the two mammograms are the most important problem for the system to overcome. Through a number of experiments, we have found that there are three features of clustered microcalcifications to which the shape of the breasts is irrelevant: gradient, energy and entropy codes. The gradient codes are used to determine the extent of roughness on the surface of clustered microcalcifications. The greater the gradient, the rougher the surface. The energy codes are a determiner for the luminosity of the clustered microcalcification organization. Even if a clustered microcalcification is deformed, its energy will have little change. The entropy codes are used to determine the changes of clustered microcalcifications in gray scale values. The same clustered microcalcification has a similar entropy code. The above-mentioned three features won't be easily affected by deformation of clustered microcalcifications, and thus are adopted to calibrate their localization.

As for the methods of clinic diagnosis of breast cancer, early in 1993 Gunilla Svane et al. had used both CC and MLO Views in diagnosis, reported in Mosby (pp. 126–130). Until now, this method has become a normal method of diagnosis. Through comparison of the two mammograms, doctors can identify the positions and attributes (benign or malignant) of lesions, which is very useful for needle positioning before biopsies. Whether the positions are correct or not depends on the doctors' experience, especially when two or more lesions exist. It is vital to needle biopsies that a doctor has plenty of experience to assure a successful localization. An incorrect localization supposition will increase not only the number of needle biopsies, but also the number of mammograms. (After each needle biopsy, mammograms should be taken again in both CC and MLO views to assure that the needle has reached the focus organization.) Increased taking mammograms will increase the cost in terms of medical resources and the time of medical personal.

The system of the Invention presents a 3-D localization of clustered microcalcifications by mammograms taken in CC and MLO Views. As shown in FIG. 1(a), hospitals should provide digital mammographic equipment connected to a PC computer or workstation to display the 3-D structure of a breast. The computer should have the system software of the Invention installed to present the positions of clustered microcalcification lesions in a 3-D breast model for doctors' reference when determining the positions of needle biopsies. In the System Operation Flow Chart, FIG. 1(b), the image of clustered microcalcification area can be detected by the computer automatically, and selected and positioned by doctors. Features of these two images will then be captured; calibrated and, at last, transformed into corresponding 3-D spatial coordinates. Using this technique clustered microcalcifications are displayed in a 3-D breast model.

Computers are not only applied in the display of breasts' 3-D images, but also utilized in highly technical image technique such as automatic detection and determination of clustered microcalcifications, calibration of clustered microcalcifications in CC and MLO Views, and nipple automatic detection. Unlike other common 3-D image techniques, the precise positions and coverage of clustered microcalcifications can be displayed. Auto-detection and separation techniques of breast clustered microcalcifications and auto-detection of breast nipples by computers have been reported by Chien-Shun Lo et al. in Proc. ICS (pp. 247–253, 1996) and by R. Chandrasekhar et al. in IEEE Trans. Medical Imaging (vol. 16, no. 5, pp. 483–494, 1997). However, the computer-aided localization system used in the Invention can integrate with the developed computer-aided diagnosis system to produce a 3-D display of clustered microcalcifications, in addition to helping doctors when doing section operations. The Invention, 3-D Localization of Clustered Microcalcifications Using Cranio-Caudal and Medio-Lateral Oblique Views, places emphases on calibration and localization of clustered microcalcifications in CC and MLO Views, and on coordinate-transformation techniques in displaying breast 3-D models.

1. Feature Capturing

Breasts will be constricted while mammograms are taken and, as a result, clustered microcalcifications will be transformed and their positions shifted. Hence, having proved their efficiency by experiment, 3 features, which are independent of shape and position factors, are adopted for 3-D localization: gradient, energy and local entropy codes. Gradient can capture the differences of gray-scale values, which is useful in determining the roughness of clustered microcalcification surface. Energy is used to capture the maximum kinetic energy in distribution of clustered microcalcifications. And local entropy code is used to detect the homogeneity in distribution of gray-scale values. For the same clustered microcalcifications, the above three features will be similar, in despite of their shapes.

A) Gradient code (GC): the conception of gradient code comes from the "Texture Analysis" reported by N. K. Pal et al. in Signal Processing (vol. 16, pp. 97–108, 1989). It is calculated via the change amount in the co-occurrence matrix of an image. Presume the change range of gray-scale values is $G=\{0,1,\ldots,L-1\}$, we define $$n_{ij} = \sum_{l=1}^{M} \sum_{k=1}^{N} \delta(l,k), \quad (1)$$

where $n_{ij}$ stands for the occurrence times of pixels changing from gray-scale i to j at two relative positions. In the formula, $$\delta(l,k) = \begin{cases} 1; & \text{if}(I(l,k) = i \text{ and } I(l, k-1) = j) \text{ or} \\ & (I(l,k) = i \text{ and } I(l-1,k) = j) \\ 0; & \text{otherwise} \end{cases} \quad (2)$$

I(l,k) stands for the pixel gray-scale value at (l, k) position, and M×N stands for the size of the image.

Figure 2:
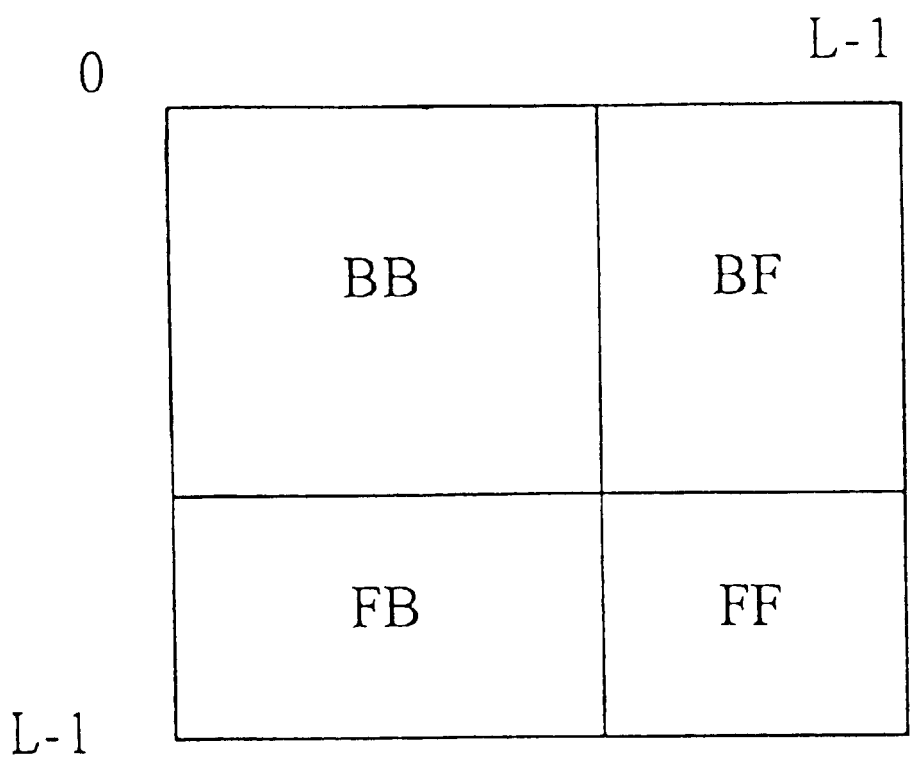
FIG. 2 Four possible combinations of co-occurrence matrix divided by the thresholding value.

From Formula (1)

$$n = \sum_{i=0}^{L-1} \sum_{j=0}^{L-1} n_{ij}, \text{ and } p_{ij} = \frac{n_{ij}}{n},$$

the probabilities of changes from gray-scale i to j, we define co-occurrence matrix as $$W = [p_{ij}]_{i,je}.$$

if $\tau$ is a thresholding value between the dissociated object and the background, all possible gray-scale values can be divided into two groups: $G_0=\{0, 1, \ldots, \tau\}$ and $G_1=\{\tau+1, \ldots, L-1\}$, in which $G_0$ is the gray-scale range of the background, and $G_1$ is that of the object. As shown in FIG. 2, the co-occurrence matrix may be separated by $\tau$ into four combinations: $G_0\times G_0, G_0\times G_1, G_1\times G_0$ and $G_1\times G_1$, corresponding to BB, BF, FB and FF areas. Then the gradient GC of the object can be calculated:

$$GC = \frac{1}{(L-\tau)\times(L-\tau)} \sum_{i=\tau+1}^{L-1} \sum_{j=\tau+1}^{L-1} |i-j|p_{ij}. \quad (3)$$

B) Energy Code (EC): In the process of clustered microcalcification calibration, the mammogram is divided into 64×64 areas. Assuming $x_i=(x_{i1}, x_{i2}, \ldots, x_{i64})^T$ stands for any of the area in the image, we can compute the correlation matrix from the formula:

$$R = \frac{1}{64}\sum_{i=1}^{64} x_i x_i^T.$$

Thus, the energy code is defined as the greatest eigenvalue in the correlation matrix, that is, $$EC = \lambda_{max} = \max_{1 \leq i \leq 64}\{\lambda_i\}.$$

C) Local entropy code (LEC): The conception of entropy originates from Elements of Information Theory (John Wiley) reported by T. Cover el al., in 1991, which is used to measure the amount of information hidden in resources. If information comes from an object, entropy can then be used to describe how much information is hidden in the object. To obtain the amount of information in an object, we must normalize the transition probability in the co-occurrence matrix to be a unit matrix (formula (4)) listed below:

$$p_{ij}^{FF} = \frac{n_{ij}}{\sum_{i=\tau+1}^{L-1}\sum_{j=\tau+1}^{L-1} n_{ij}} = \frac{n_{ij}/n}{\left(\sum_{i=\tau+1}^{L-1}\sum_{j=\tau+1}^{L-1} n_{ij}/n\right)} = \frac{p_{ij}}{\sum_{i=\tau+1}^{L-1}\sum_{j=\tau+1}^{L-1} p_{ij}}, \quad (4)$$

in which $\{P_{ij}^{FF}\}_{i \in G_1, j \in G_1}$ is the probability distribution, and its corresponding entropy is $$H_{FF}(\tau) = -\sum_{i=\tau+1}^{L-1}\sum_{j=\tau+1}^{L-1} p_{ij}^{FF} \log p_{ij}^{FF}. \quad (5)$$

Therefore, the local entropy code can be calculated from the formula, LEC=$H_{FF}$ ($\tau^*$). In the formula, $\tau^*$ is the best thresholding value obtained from the "entropic thresholding methods" reported in Signal Processing (vol. 16, pp. 97–108) written by N. K. Pal in 1989.

2. Calibration Steps

Figure 1B:
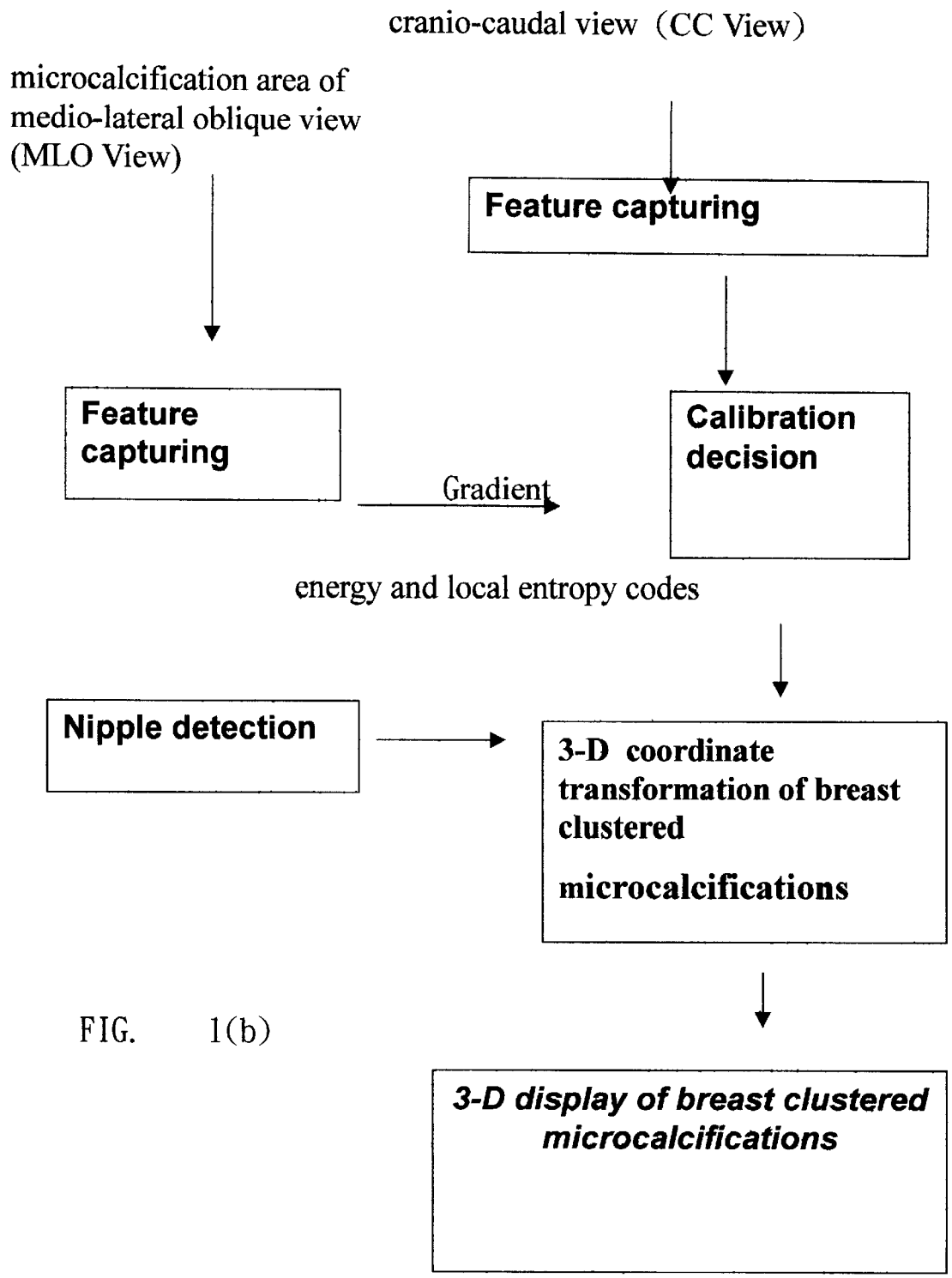
FIG. 1(b) System Operation Procedure

As shown in FIG. 1(b), the gradient, energy and local entropy codes of suspicious clustered microcalcification areas are first calculated. According to the Binary Decision Tree shown in FIG. 3, Image areas can be classified into 8 matching groups according to the three features: gradient, energy and local entropy codes. The calibration steps are:

A) The CC and MLO images are divided into 64×64-pixel size of sub-images, each with an overlap of 32×32 pixels between two adjacent areas.

B) The gradient, energy and local entropy codes of each sub-image area are calculated.

C) The sequence described in the Binary Decision Tree is followed to classify every sub-image area into one of 8 matching groups according to its gradient, energy and local entropy codes.

Figure 3:
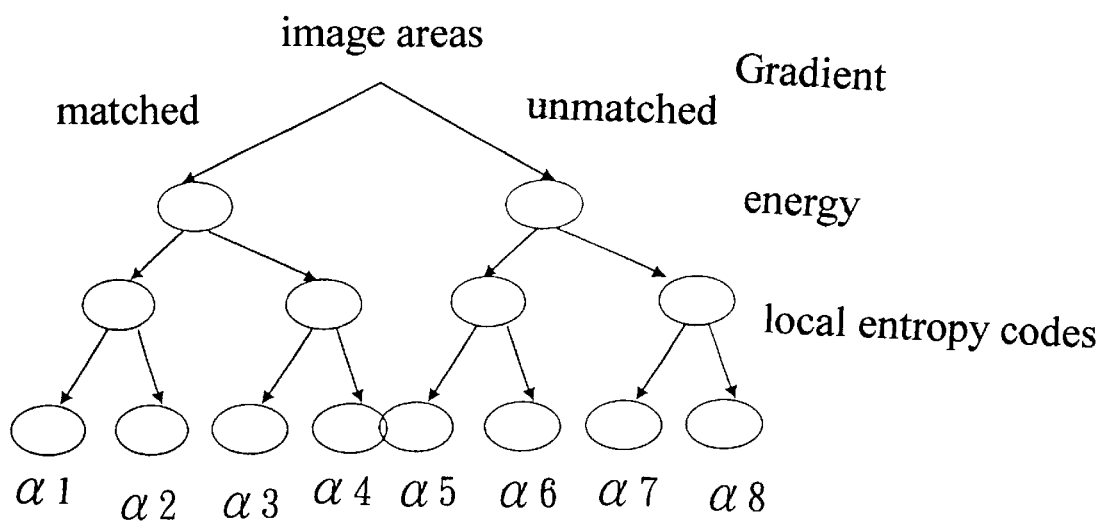
FIG. 3 Binary decision tree of clustered microcalcification calibration.

There are eight leaves, $\{\alpha_1, \alpha_2 \ldots, \alpha_8\}$, in the Binary Decision Tree as shown in FIG. 3, representing eight classifications respectively. The first leaf at the left, $\alpha_1$, is the area that matches the best; and the one at the right end, $\alpha_8$, the worst. These eight groups are categorized into two sets: one is "match groups," the image areas of which are regarded as the positions of corresponding clustered microcalcifications; and the other set is "mismatch groups," the image areas of which are regarded as not corresponding. The degree of match for categorization depends on the extent of accuracy of calibration and receiver-operating characteristic (ROC) curve that users require.

3-1. 3-D Spatial Localization of Clustered Microcalcifications

As stated above, the Invention uses "3-D Localization of Clustered Microcalcifications Using Cranio-Caudal and Medio-Lateral Oblique Views " to achieve calibration of clustered microcalcifications in CC and MLO Views. In this method, control points in CC and MLO mammograms need to be located for calibrating lesions coordinates—the best choice are the coordinates of the nipples. The nipple positions can be marked manually or by an automatic method reported in IEEE Trans. Medical Imaging (vol. 16, no. 5, pp. 483–494) by R. Chandrasekhar et al. in 1997. Assume that $(x_{nipple,CC}, z_{nipple,CC})$ and $(y_{nipple,MLO}, z_{nipple,MLO})$ are the coordinates of the nipple in CC and MLO images, respectively. After the nipple positions in CC and MLO images are marked, the coordinate of each pixel $(x_{CC}, z_{CC})$ in the CC image, then, is adjusted as $(\tilde{x}_{CC}, \tilde{z}_{CC})=(x_{CC}-x_{nipple,CC}, z_{CC}-z_{nipple,CC})$. In the same way, each pixel $(y_{MLO}, z_{MLO})$ in the MLO image can be adjusted as $(\tilde{y}_{MLO}, \tilde{z}_{MLO})=(y_{MLO}-y_{nipple,MLO}, z_{MLO}-z_{nipple,MLO})$. Since the MLO image is not always taken at a right angle, and often inclines for an angle of θ, $(\tilde{y}_{MLO}, \tilde{z}_{MLO})$ may be amended to be $(\tilde{y}_{MLO} \cos \theta, \tilde{z}MLO)$.

Figure 4:
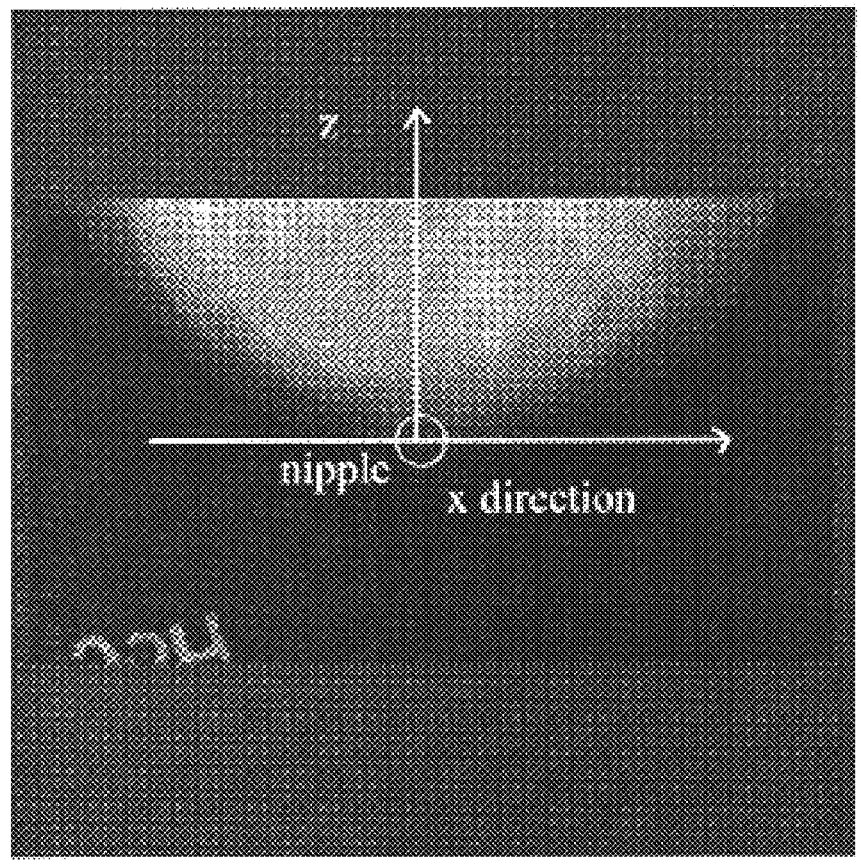
FIG. 4a) X-Y plane shows the CC View.
FIG. 4b) Y-Z plane shows the MLO View.
Figure 4:
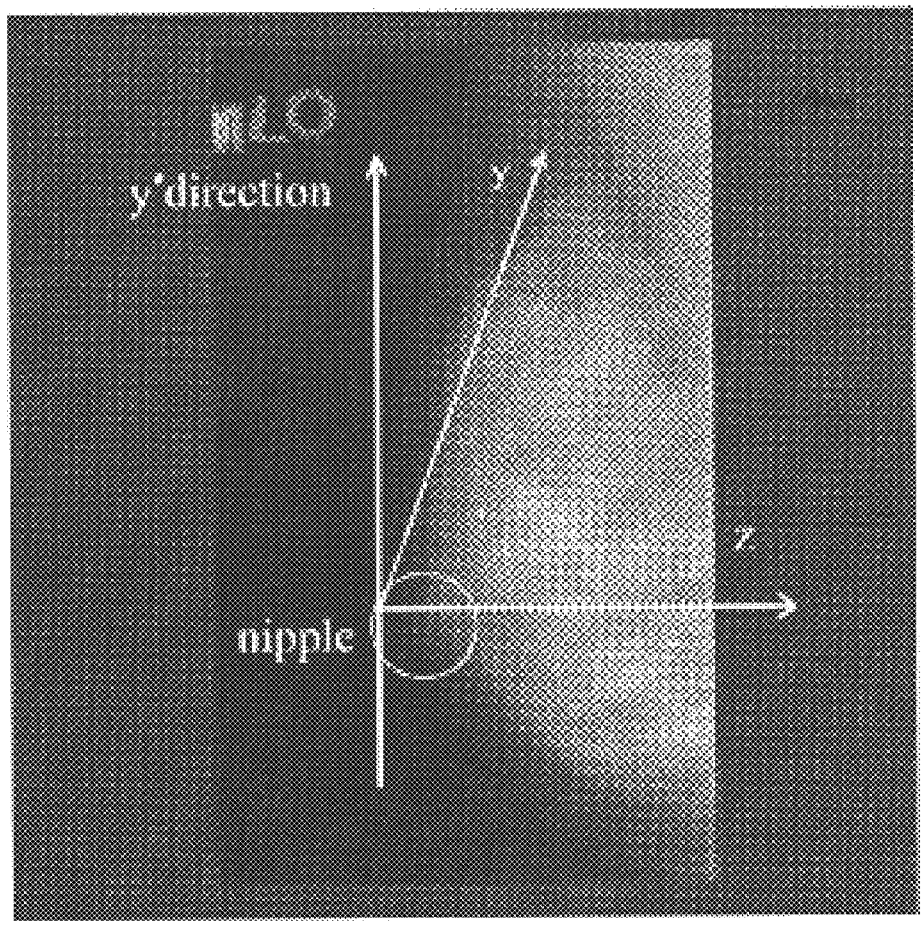

3-2. Calculation of 3-D Coordinates of Clustered Microcalcifications via Combination of CC and MLO Images Since CC and MLO mammograms are 2-D images, they may be regarded, without loss of universality, as X-Z and Y-Z planes, as shown in FIGS. 4-a and 4-b. If a 3-D point $\zeta=(x, y, z)$ falls on $(x_{CC}, z_{CC})$ in CC image and $(y_{MLO}, z_{MLO})$ in MLO image respectively. Through transformation based on the origin (the nipple), $(\tilde{x}_{CC}, \tilde{z}_{CC})$ and $(\tilde{y}_{MLO}, \tilde{z}_{MLO})$ are obtained. And in the same way, $\zeta=(x, y, z)$ can be transformed into $\tilde{\zeta}=(\tilde{x}, \tilde{y}, \tilde{z})$. In order to obtain the coordinate $\tilde{\zeta}=(\tilde{x}, \tilde{y}, \tilde{z})$, we presume there is a virtual y axis $\tilde{y}_{CC}$ in the CC image, and a virtual x-axis $\tilde{x}_{MLO}$ in MLO image. Accordingly, two virtual coordinates appear, standing for the same point. It should be noted that these two virtual coordinates share the same z-axis. Therefore, we may use it as a basis for transformation and then calculate their relative location. We can infer $\tilde{y}_{CC}$ and $\tilde{x}_{MLO}$ from formula (6–7).

$$\frac{\tilde{x}_{CC}}{\tilde{x}_{MLO}} = \frac{\tilde{y}_{CC}}{\tilde{y}_{MLO}} = \frac{\tilde{z}_{CC}}{\tilde{z}_{MLO}} \quad (6)$$

$$\tilde{y}_{CC} = \left(\frac{\tilde{z}_{CC}}{\tilde{z}_{MLO}}\right)\tilde{y}_{MLO} \text{ and } \tilde{x}_{MLO} = \left(\frac{\tilde{z}_{MLO}}{\tilde{z}_{CC}}\right)\tilde{x}_{CC} \quad (7)$$

The easiest way to generate $\tilde{\zeta}=(\tilde{x}, \tilde{y}, \tilde{z})$ is to assume $\tilde{\zeta}=(\tilde{x}, \tilde{y}, \tilde{z})$ falls between $(\tilde{x}_{CC}, \tilde{y}_{CC}, \tilde{z}_{CC})$ and $(\tilde{x}_{MLO}, \tilde{y}_{MLO}, \tilde{z}_{MLO})$. And via formula (8), we can determine the 3-D coordinate of $\tilde{\zeta}=(\tilde{x}, \tilde{y}, \tilde{z})$.

$$\tilde{x} = \frac{\tilde{x}_{MLO} + \tilde{x}_{CC}}{2}, \quad \tilde{y} = \frac{\tilde{y}_{MLO} + \tilde{y}_{CC}}{2}, \quad \tilde{z} = \frac{\tilde{z}_{MLO} + \tilde{z}_{CC}}{2} \quad (8)$$

3-3. 3-D Display of Clustered Microcalcifications $\tilde{\zeta}=(\tilde{x}, \tilde{y}, \tilde{z})$ is a 3-D coordinate obtained from transformation, based on the control point—nipple location, through calibration of two 2-D coordinates in CC and MLO images. To display clustered microcalcifications with a 3-D breast model, we have to normalize $\tilde{\zeta}=(\tilde{x}, \tilde{y}, \tilde{z})$, lest the coordinates of clustered microcalcifications distort due to different sizes of breasts. So, the depth of breast $D_{CC}$ and $D_{MLO}$ in CC and MLO images, respectively, which are the shortest distances from the tip of nipple to the thoracic cavity, must be first acquired. Often these two values will not be identical for there are errors exist in mammograms taking while breasts are constricted under different pressures. As a result of this problem, we take $$D = \frac{D_{CC} + D_{MLO}}{2}$$

as a normalization factor, and the 3D breast coordinate in the virtual model is computed as follows:

$$x^* = \frac{\tilde{x}}{D}, \quad y^* = \frac{\tilde{y}}{D}, \quad z^* = \frac{\tilde{z}}{D} \tag{9}$$

4. Results of Simulation

Clustered microcalcifications can be detected through the method reported in Proc. ICS (pp. 247–253) by Chien-Shun Lo et al. in 1996 or Proc. CVGIP'96 (pp. 127–134) by B. C. Hsu et al. in 1996. Three features—gradient, energy and local entropy codes are calculated via these methods by the system of the Invention, and can be applied to calibrate clustered microcalcifications in CC and MLO images. Finally, the results after calibration will be displayed and localized in a 3-D model. We simulated ten pairs of CC and MLO images for assessment of the system. Among these ten pairs, there were three pairs having two clustered microcalcifications. Thus, a total of thirteen clustered microcalcifications were used in the experiment. After calibration using the system, high accuracy of up to 96% was achieved.

Figure 5:
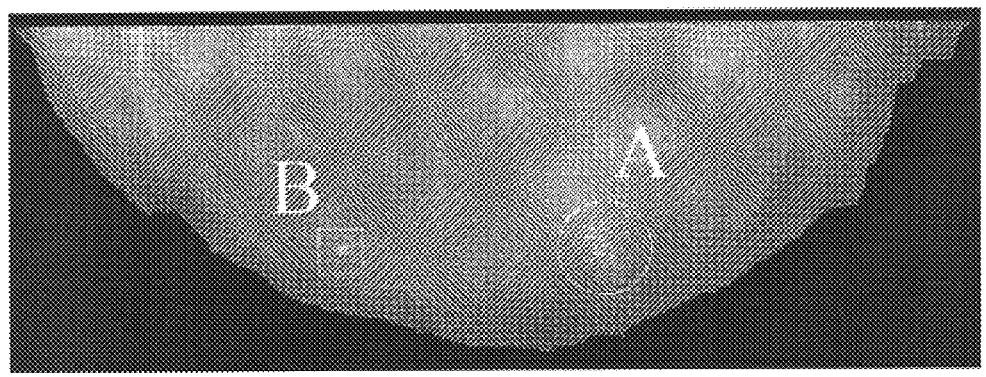
FIG. 5 A case showing two clustered microcalcifications
Figure 5:
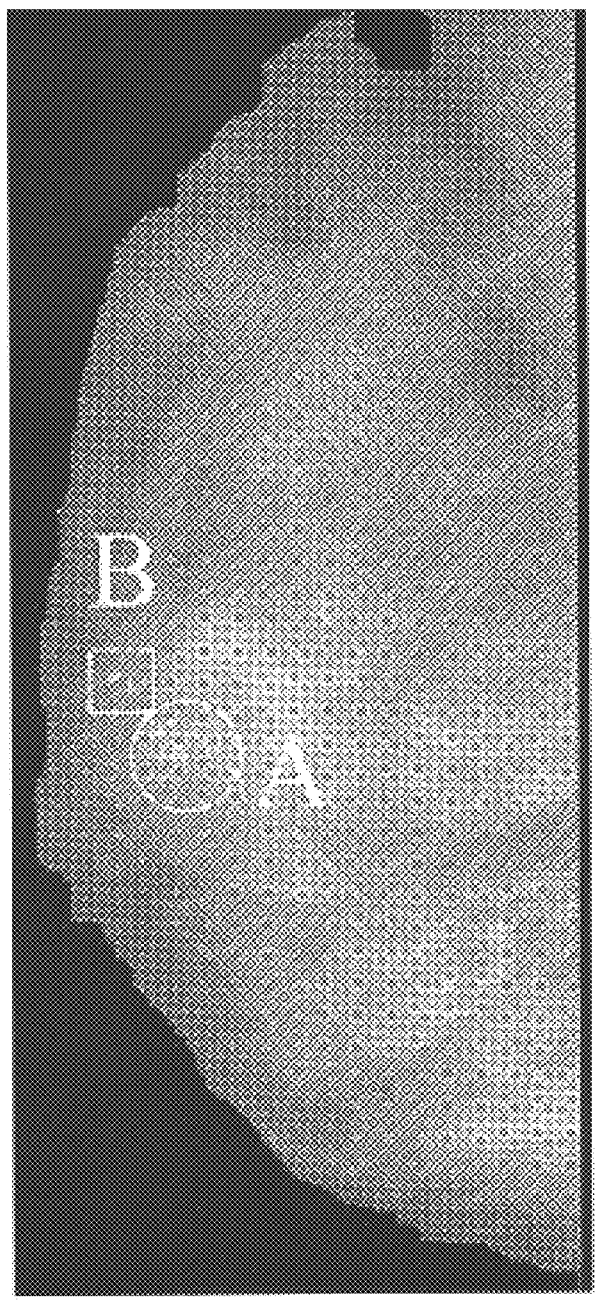
Figure 6:
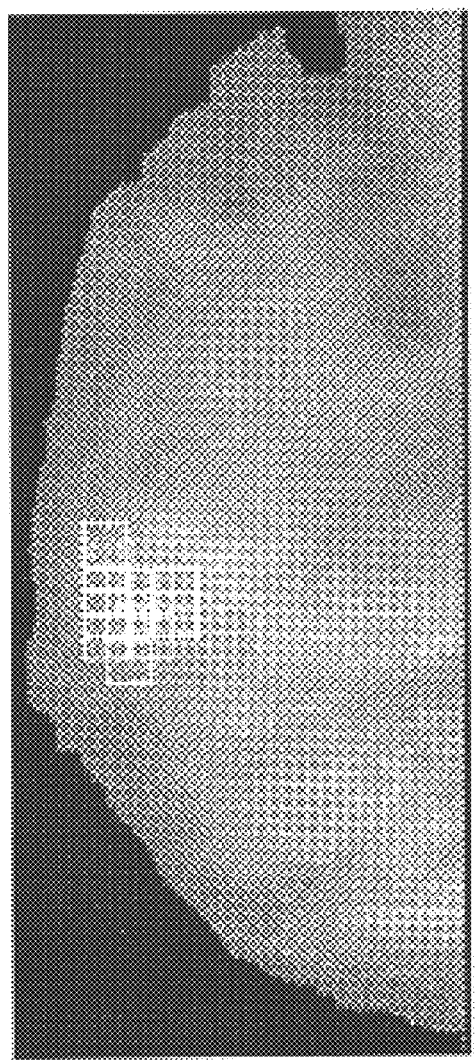
FIG. 6 Images after calibrated
Figure 6:
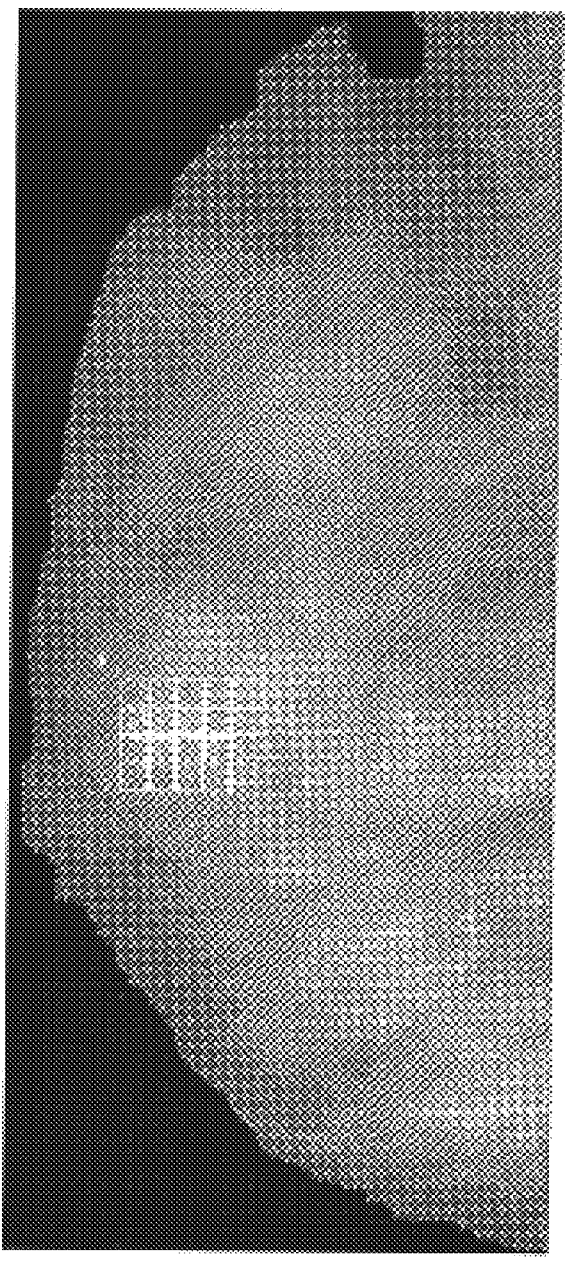
Figure 6:
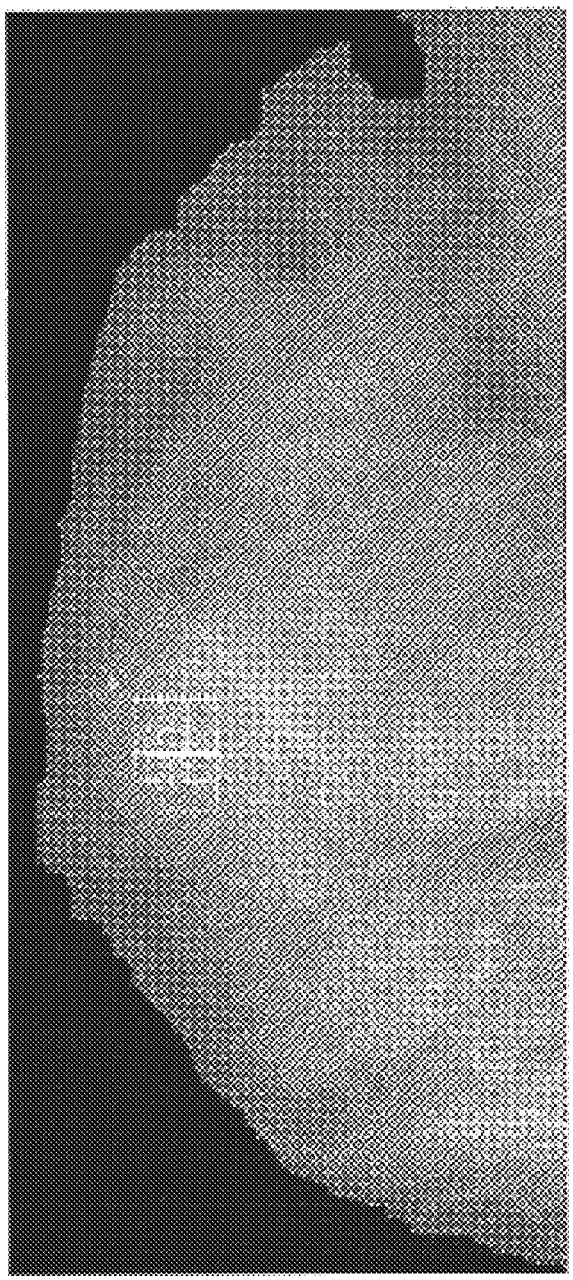
Figure 7:
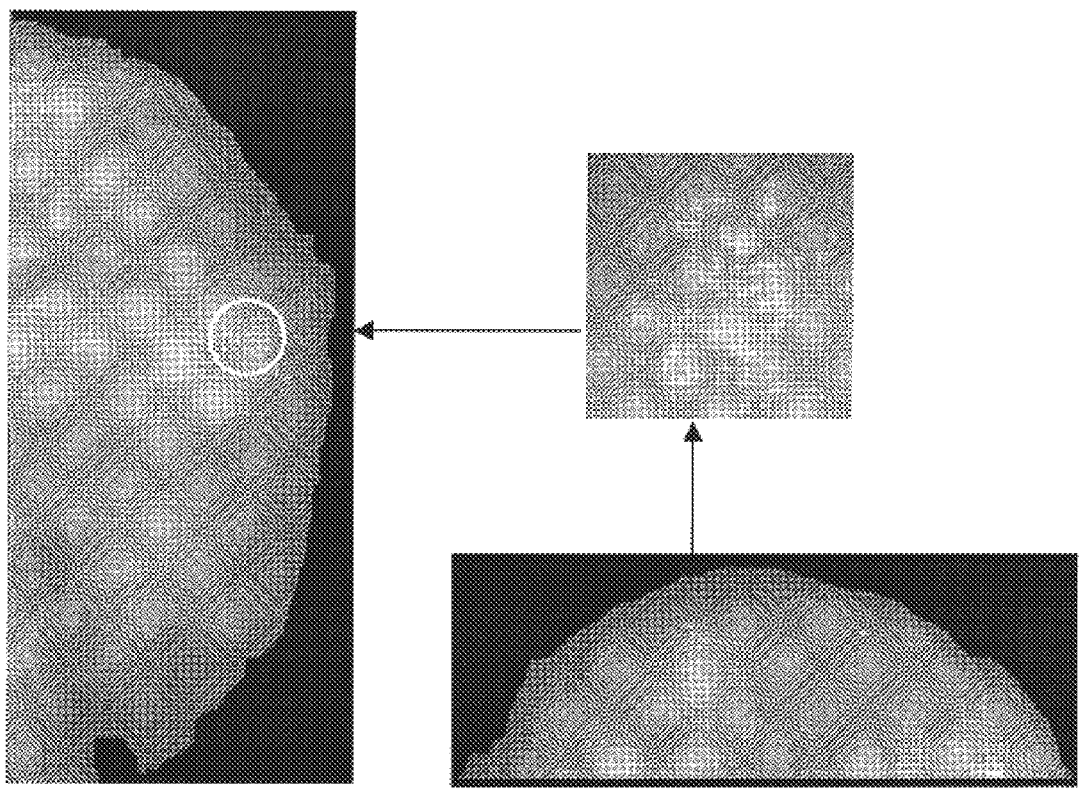
FIG. 7 Results after calculation
Figure 8:
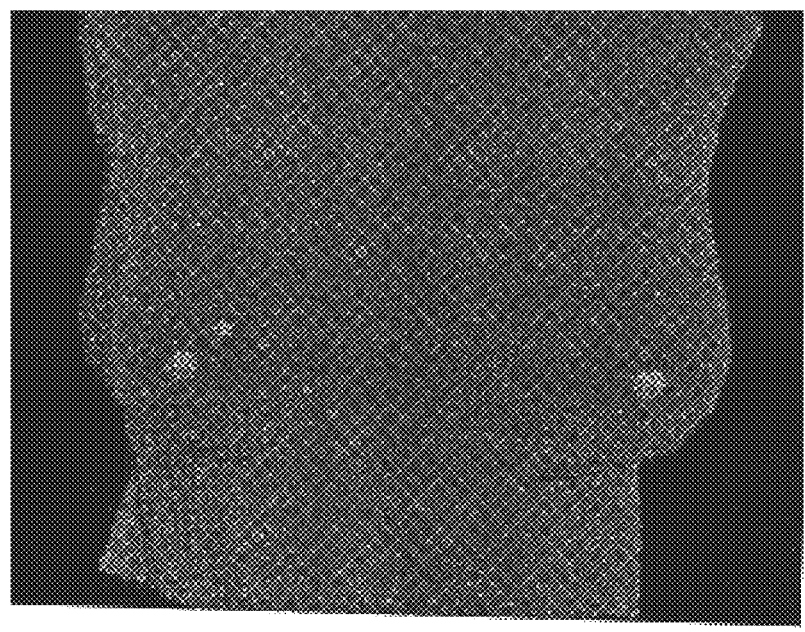
FIG. 8 Localization display after calibrated
Figure 8:
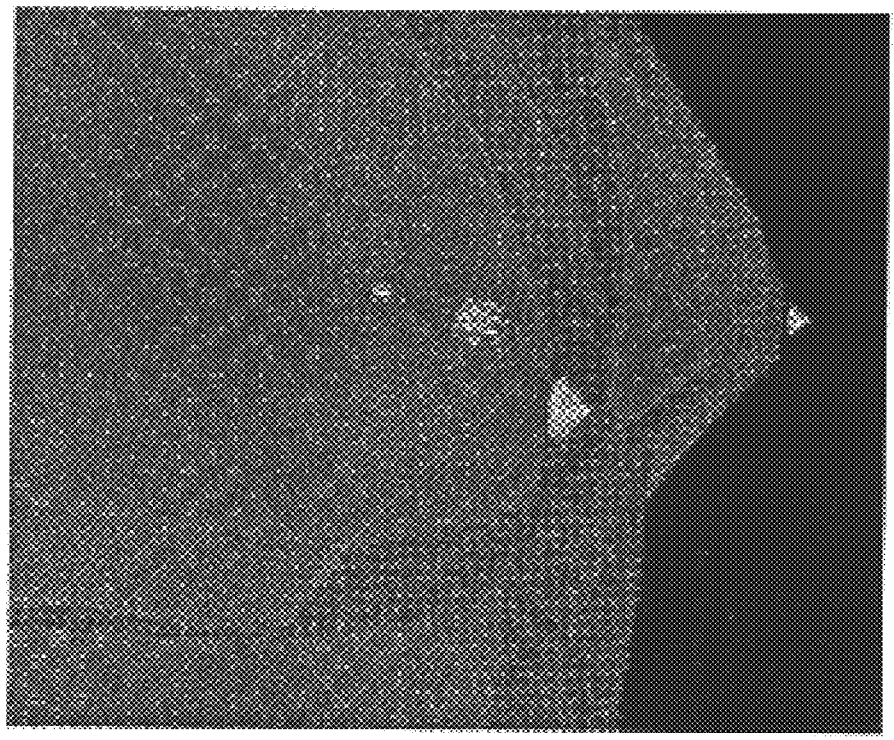
Figure 8:
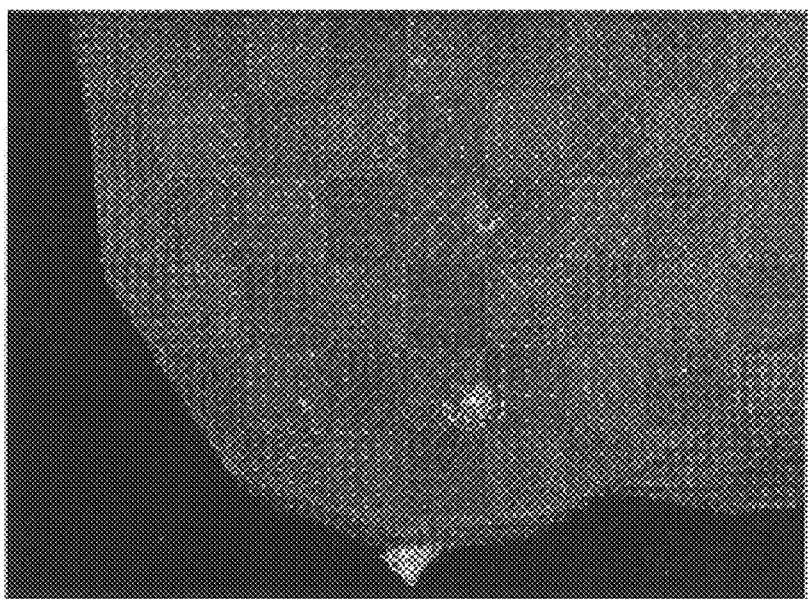

In order to demonstrate the practical and effective characteristics of the Invention, we will illustrate its system operational flow with the examples below. FIGS. 5(a) and 5(b) show CC and MLO images, respectively, of one difficult case in which two clustered microcalcifications are found. These are circled to show their occurring locations and coverage. In this case, these two clustered microcalcifications are rather close to each other. Therefore, it is more difficult to calibrate the MLO image with its CC image. However, our system shows remarkable abilities in solving this difficult task. FIGS. 6(a), 6(b) and 6(c) show the results after calibration as per the sequence required by the Binary Decision Tree in FIG. 3. FIG. 6(a) is the result calibrated by the first feature: gradient; and in FIG. 6(b), the second feature is added; finally, the third feature is added and the result is shown in FIG. 6(c). FIG. 7 shows the result after the radius is calculated by integrating the images of match areas. Finally, the calibrated clustered microcalcifications are localized and displayed in a 3-D model, as shown in FIGS. 8(a)–(c).

Characteristics and Efficacy

The Invention provides a 3-D localization method of clustered microcalcifications by using computers, to assist doctors in making fast and precise lesion localization. With the use of the Invention, not only will the operation time be shortened, and the costs of mammographic and medical material reduced, but also injuries caused by needle biopsies and taking mammograms will be decreased.

Relations Between the Invention and the Original Project

The invention is a significant achievement in the development of a computer-aided diagnosis system for clustered microcalcification mammography, in which we use CC and MLO images to obtain 3-D lesion localization. Thus, the patenting of the Invention is absolutely necessary to protect the achievements of the project.

What is claimed is:

1. A localization method for clustered microcalcifications using CC and MLO views in a displayed 3-D breast virtual model, comprising the steps of:

(a) using gradient, energy and local entropy codes as features to take mammograms in CC and MLO Views;

(b) classifying clustered microcalcifications according to their features using a binary decision tree, and determining if two clusters are identical as per the results of classification;

(c) marking the nipple in CC and MLO views via analysis of the surface gradients and normal vector angles of a breast;

(d) transforming the positions of calibrated clustered microcalcifications relative to the nipple in CC and MLO Views into 3-D spatial coordinates;

(e) transforming the positions and coverage of the clustered microcalcifications into 3-D spatial coordinates and displaying the clustered microcalcifications in the 3D breast virtual model.

2. The method of claim 1 further comprising the step of; using the captured gradient code to assess a roughness of a clustered microcalcification surface.

3. The method of claim 1 further comprising the step of; using the captured energy code to assess a kinetic energy distribution of the clustered microcalcifications.

4. The method of claim 1 further comprising the step of; using the local entropy code to detect a homogeneity distribution of gray-scale values.

5. The method of claim 1 fixer comprising the step of; transforming the clustered microcalcifications from CC and MLO images to a 3-D breast virtual model using the breast nipple as an origin, and an average depth of the breast as a normalizing factor.

* * * * *